Jan. 10, 1967    J. R. TREMBLAY    3,296,764
COUPLING FOR CONSTRUCTION ELEMENTS
Filed Dec. 26, 1963    5 Sheets-Sheet 1
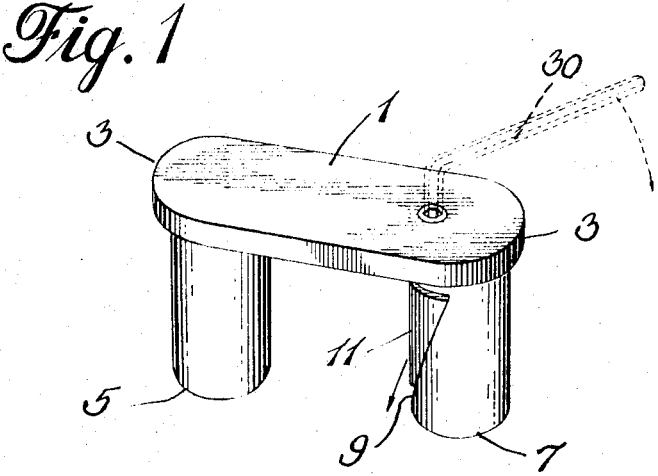
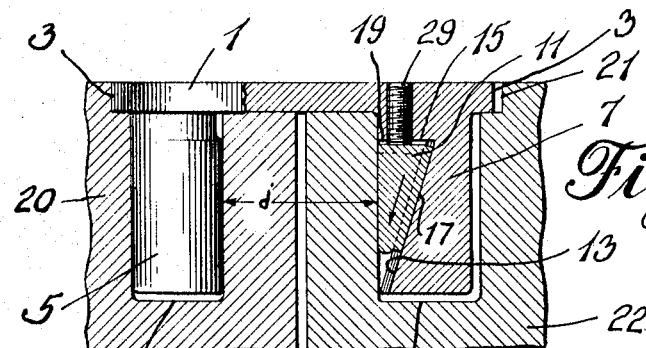
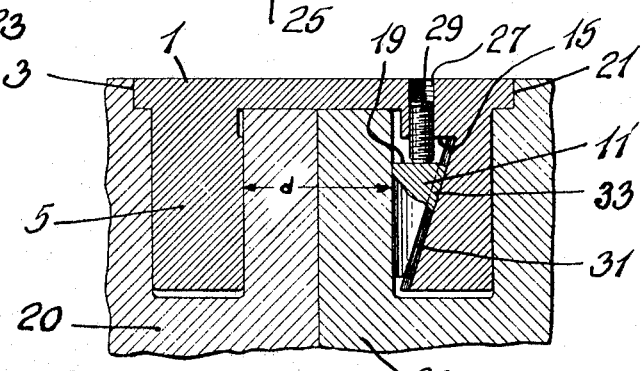
INVENTOR
J. Rosaire TREMBLAY
BY
ATTORNEYS

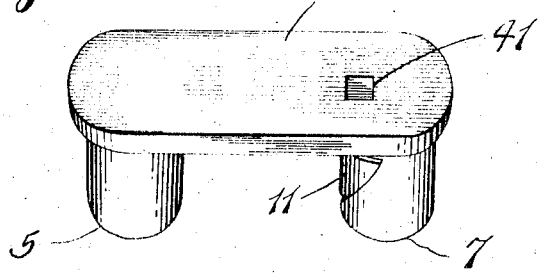
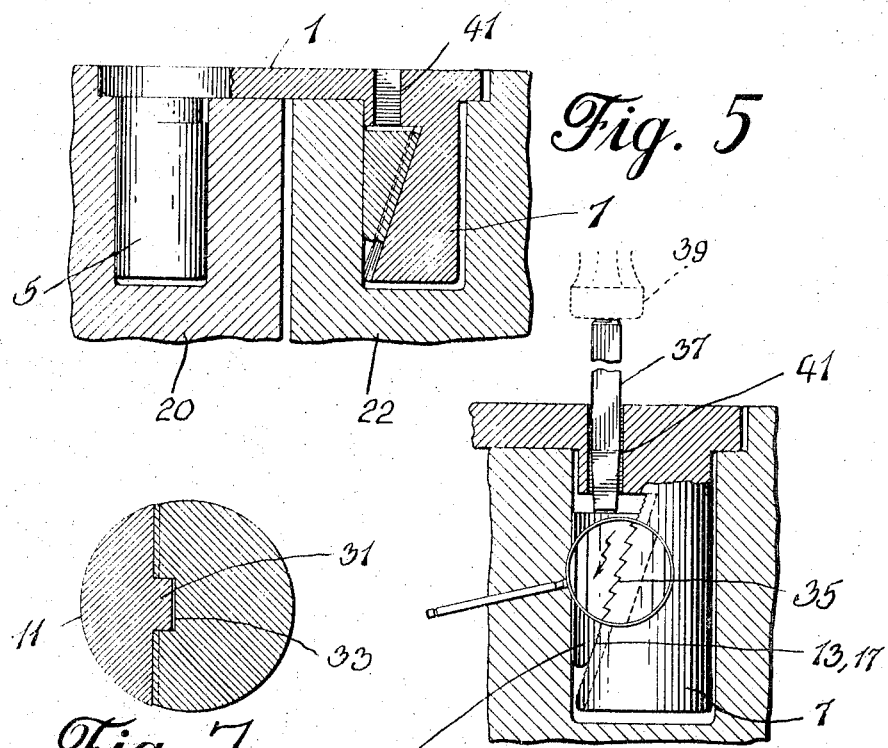

Jan. 10, 1967  J. R. TREMBLAY  3,296,764
COUPLING FOR CONSTRUCTION ELEMENTS
Filed Dec. 26, 1963  5 Sheets-Sheet 3
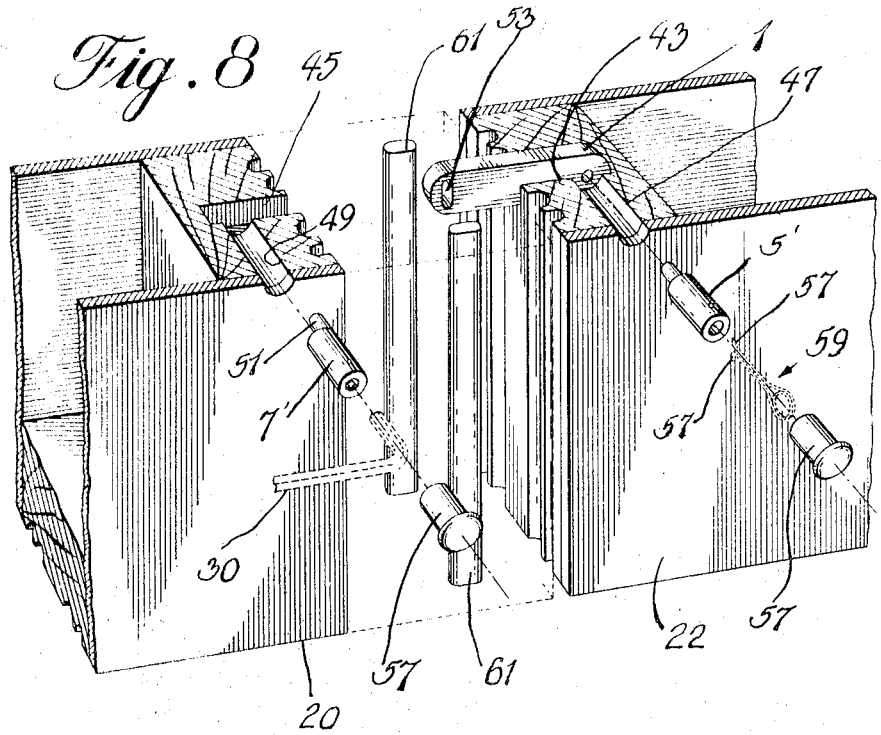
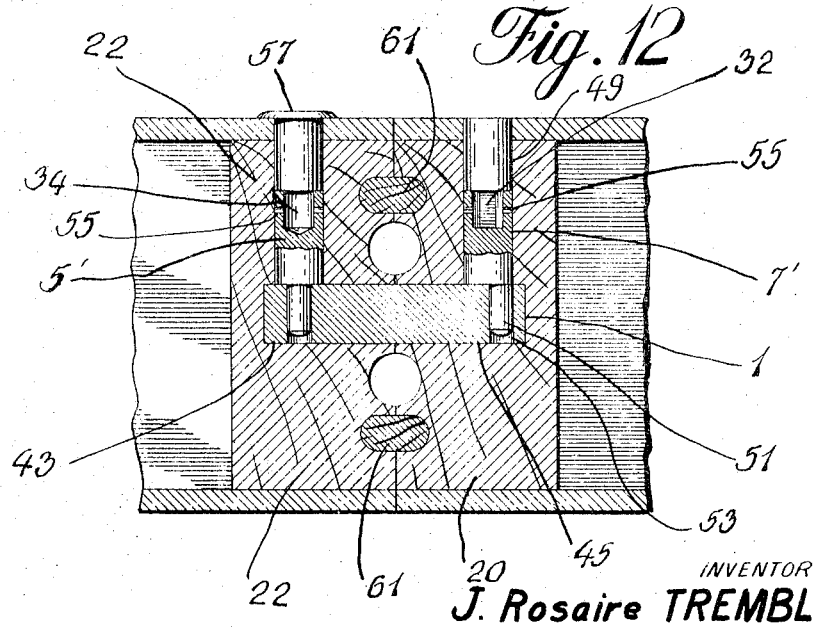
INVENTOR
J. Rosaire TREMBLAY
BY
ATTORNEYS Jan. 10, 1967  J. R. TREMBLAY  3,296,764
COUPLING FOR CONSTRUCTION ELEMENTS
Filed Dec. 26, 1963 5 Sheets-Sheet 5

INVENTOR
J. Rosaire TREMBLAY
BY
ATTORNEYS

United States Patent Office 3,296,764
Patented Jan. 10, 1967

3,296,764
COUPLING FOR CONSTRUCTION ELEMENTS
Joseph Rosaire Tremblay, St. Romuald, Portneuf County, Quebec, Canada
Filed Dec. 26, 1963, Ser. No. 333,586
8 Claims. (Cl. 52—584)

The instant invention relates to a coupling for the assembly and the dismounting of temporary or prefabricated buildings and the like and is an improvement of the device described and claimed in my prior U.S. patent application No. 207,533, filed July 5, 1962.

The coupling as shown and described in my prior application finds use particularly in prefabricated buildings and dwellings where large structural members, such as walls, ceilings, floor and roof panels are prepared in a factory and then assembled on site. Such prefabricated buildings may be put up, with the coupling of the invention, without the use of conventional connecting and fastening members such as nails, screws or bolts.

The newly developed coupling is an improvement of my prior coupling in that it is of simpler and sturdier construction, being made of lesser relatively moving parts, in some embodiments. Equally important is the fact that it is easier to use and requires less strength. Also, in some embodiments, the coupling may be positively and permanently locked into closed position so that no amount of vibration is likely to loosen the joint between the two structural members.

The above-mentioned advantages may be obtained with the improved construction coupling of my invention which comprises a plate adapted to bridge the two structural members to be connected; a pair of spaced parallel legs projecting from one face of the plate and entering into suitable holes in the construction elements; a wedge recess, in one of the legs, facing the other leg and a wedging insert received within said recess; the recess and insert having cooperating wedging surfaces inclined towards said other leg whereby displacement of the wedge in the recess causes movement thereof and abutment against the bore of the corresponding hole forcing movement of the corresponding member in the direction of the other member to thus couple the two elements together, and means to displace the wedging insert.

A better understanding of the invention will be possible as the following description of preferred embodiments of my invention proceeds having reference to the appended drawings wherein:

FIG. 1 is a perspective view of a construction coupling made according to the invention;

FIGS. 2 and 3 are longitudinal cross-sectional views of the coupling shown mounted on two construction elements to be coupled, the two positions illustrated being respectively the uncoupled and fully coupled conditions;

FIG. 4 is a perspective view of a second embodiment of the invention;

FIG. 5 is a vertical cross-sectional view of the embodiment of FIG. 4;

FIG. 6 is an enlarged cross-sectional view of part of the coupling of FIG. 5 intended to illustrate a particular feature of the wedging means;

FIG. 7 is a transverse cross-sectional view of the wedging means;

FIG. 8 is an exploded perspective view, partly in cross-section, illustrating a still further embodiment of the invention;

FIG. 12 is a cross-sectional view in elevation of the embodiment of FIG. 8;

Figure 9:
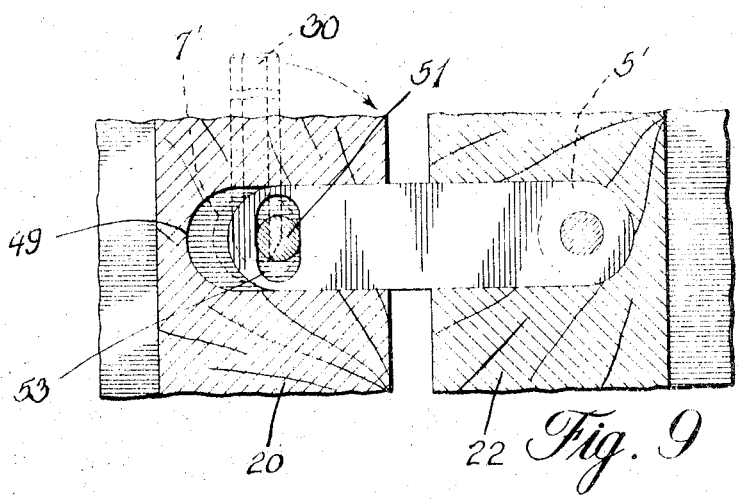
FIGS. 9, 10 and 11 are transverse cross-sectional views of the embodiment of FIG. 8 in various positions between uncoupled and fully coupled conditions.
Figure 10:
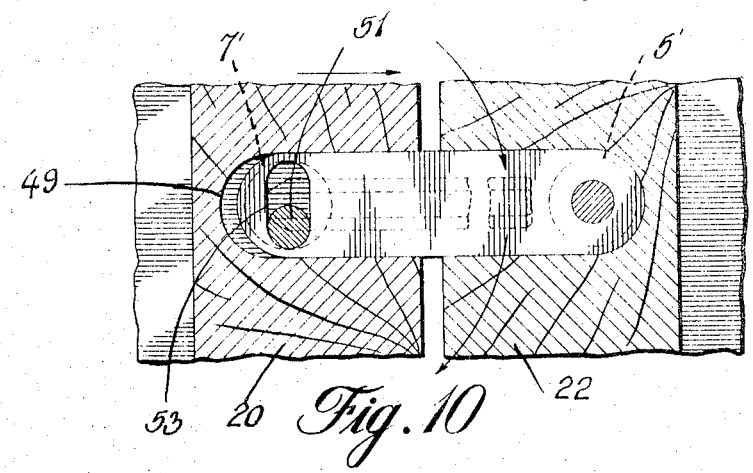

As clearly illustrated in FIG. 1, the coupling of the invention generally consists of a generally flat plate 1 having rounded ends 3, mostly for appearance purposes. Projecting perpendicularly from one face of plate 1, in parallel relationship and rigid therewith, are a first leg 5 and a second leg 7.

First leg 5 is preferably cylindrical while second leg 7, which is also preferably cylindrical, is provided with a wedge recess 9 cut out on the side thereof facing the first leg 5 and into which is received a wedging insert 11 which, in nonoperative position, has an arcuate outer surface lying in the plane of the outer surface of the leg 7.

The wedge recess 9 is right triangular in cross-section having an inclined wedging surface 13 and a top surface 15. The wedging insert 11 is similarly formed as a triangle having an inclined wedging surface 17 and a top abutment surface or wall 19.

In use, legs 5 and 7 of the above-described coupling are received in holes in a first and second construction elements 20 and 22 respectively, both of which are provided with complementary parts forming an elongated counterbore 21 for the reception of plate 1, counterbore 21 having rounded ends and a width approximately equal to that of plate 1. First element 20 has a first bore 23 while second element 22 has a second bore 25. Bore 23 is of a diameter to snugly receive the first leg 5 while second bore 25 is of a diameter to loosely receive the second leg 7. A stud 29 presently received into a hole 27 is intended to abut and press the top surface 19 to force wedging insert 11 downwardly thus causing the second element 22 to move laterally towards the first element 20 until they reach the edge abutting relationship of FIG. 3. For that purpose, it is necessary that the distance d (FIG. 3) between the two construction elements 20 and 22, when in edge abutting relationship, be smaller than the shortest distance d' (FIG. 2) between legs 5 and 7 when the wedging insert 11 is fully retracted within the wedge recess 13. Also, elongated counterbore 21 should be, in abutting relationship of elements 20 and 22, somewhat longer than plate 1 to ensure positive abutment of the two edges of members 20 and 22. Screwing of stud 29 is obtained by means of hexagonal key 30, as shown in FIG. 1.

Finally, in order to ensure good wedging action, it is suggested to provide the cooperating wedging surfaces 13 and 17 with inter-engaging groove-and-tongue guiding means 31, 33 as more particularly illustrated in FIG. 7.

The embodiment illustrated in FIGS. 4 to 7 inclusive is generally similar to that of FIGS. 1, 2 and 3 except that interlocking serrations or indentations 35 are provided on the cooperating wedging surfaces 13 and 17 to ensure positive retention of the coupling condition and locking of wedge 11 and leg 7 together. While in the embodiment of FIG. 1, stud 29 was rotated by means of an hexagonal key 30, in the embodiment of FIG. 4, wedging insert 11 is driven home by means of a punch 37 driven by a hammer 39 through a square hole 41. The coupling is, of course, permanent in this case on account of the serrations 35.

As mentioned previously, the cooperating insert 11 and leg 7 are guided in their relative displacement by means of a tongue-and-groove arrangement 31, 33.

Figure 11:
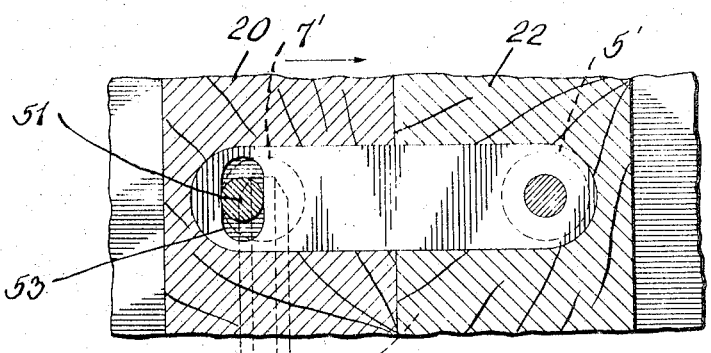

The embodiment illustrated in FIGS. 8 to 12 inclusive is slightly different. As in the other cases, the coupling joins two structural members 20, 22 each having an end edge and two parallel faces normal thereto. The said edges are provided with longitudinal grooves 43, 45 which which are adapted to register when the elements 20, 22 are joined in end abutting relationship as illustrated in FIG. 12. Each element also has a hole (47, 49) through one of its parallel faces which is adapted to communicate with the corresponding groove (43, 45). The plate 1 is received within grooves 43, 45 and thus bridges the two elements 20, 22. A first leg 5' is mounted at one end of the plate and snugly received in hole 47 while a second leg 7' is mounted at the other end of plate 1 and is snugly received in hole 49. The connection between leg 5' and plate 1 may be as shown, that is, an axial pin extension received in a suitable hole in plate 1, but it should be understood that any other removable connection is acceptable. However, second leg 7' is different and is formed of a main cylindrical body which fits snugly into hole 49 and a cylindrical extension or pivot pin 51 disposed offset from the main body 7' and received in a transverse aperture 53 (see FIGURES 8 and 9 to 11) through plate 1, the longitudinal width of said aperture in respect of the length of the plate being substantially equal to the diameter of extension 51 while the transverse width is at least equal to the diameter of the circle generated by the outermost point on pivot pin 51. In the illustrated case, the diameter of this circle corresponds to that of the main body of leg 7'. Again it may be deducted from the above description and from FIGS. 9 to 12 inclusive that, in order to obtain a tight closure of the two construction elements 20, 22 in edge abutting relationship, the position of cylindrical extension or pin 51 elements must be just slightly short of extreme rightward position, although FIGS. 11 and 12 actually show the pin as at extreme position for illustration purposes. Two extreme and one middle positions of operation of the coupling are illustrated in FIGS. 9 and 11, which illustrations are self explanatory.

Second leg 7' is provided with a hexagonal bore 32 for the reception of a key 30 to produce rotation of excentric pin 51 and movement of member 22. First leg 5' is also provided with an axial cylindrical bore 34 for a purpose to be determined later.

In the position illustrated in FIG. 9, cylindrical extension or pivot pin 51 is shown in the extreme inward position with the two construction elements 20 and 22 spread apart a predetermined distance depending on the distance between transverse aperture 53 and the first leg 5'. As second leg 7' is rotated, pivot pin 51 moves downwardly (as viewed in FIGS. 9, 10 and 11) forcing element 20 to move closer to element 22. As pivot pin 51 is rotated clockwise some more, pivot pin 51 rises in aperture 53 (FIG. 11) forcing construction element 20 closer still to element 22 until complete abutment, as in FIG. 11, is obtained.

Auxiliary features are shown in FIGS. 8 and 12, for instance, both bores 34 and 32 of legs 5' and 7' are provided with radial bore wall apertures 55 for the reception of the lateral prongs 57 (see FIG. 8) of a spring key 59 for the removal of the legs whenever necessary.

When the coupling elements are in position, plugs 57 may be used to close up the holes 47, 49.

Finally, elongated strips 61 may be used in suitable apertures in the edges of members 20 and 22 to ensure air tightness between the members.

Figure 13:
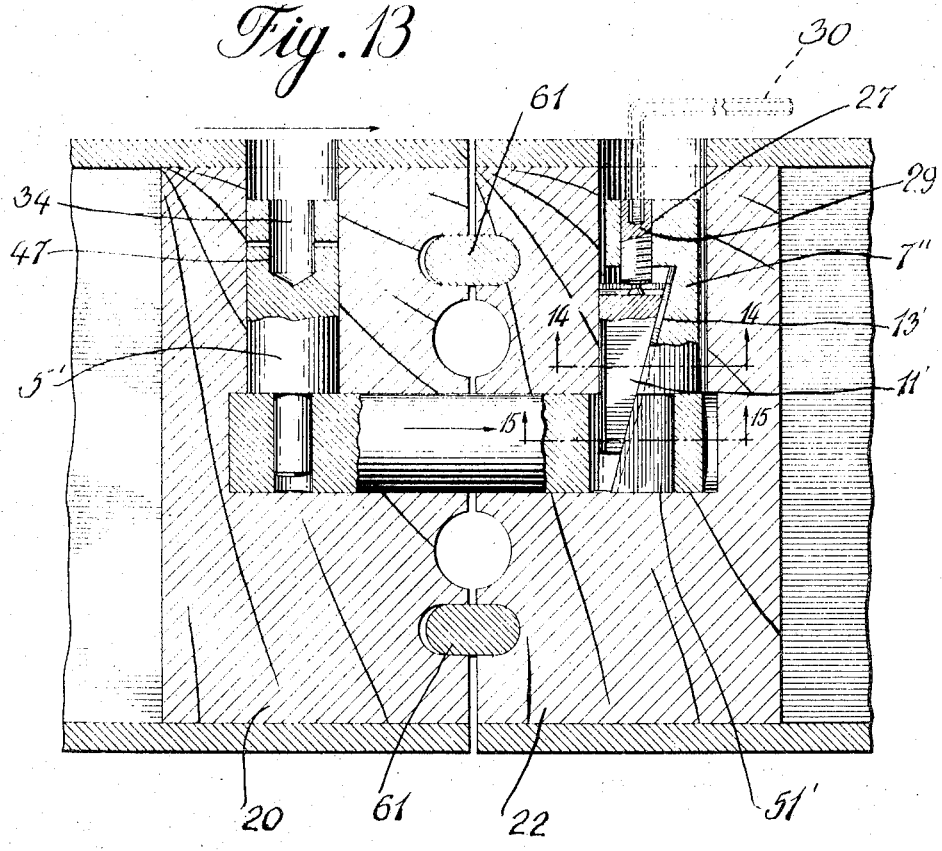
FIG. 13 is a cross-section in elevation of another embodiment of the invention.

The embodiment of FIG. 13 may be considered a combination of the features of FIG. 8 in regard to its mounting on the construction members while the locking and closing means is that illustrated more particularly in FIG. 2, with slight modification.

It will be noted that the leftward side of FIG. 13 is the same as the leftward side of FIG. 12. However, the configuration of the rightward side is quite different and the transverse aperture 53 of FIG. 8 is replaced here by a longitudinal aperture 53' through plate 1. Through this aperture is received a narrower extension 51' projecting from the end of leg 7''. The said leg is provided with a wedging recess opening in the direction of leg 5' and having an inclined wedging surface 13' against which slides the wedging surface of a wedging insert 11'.

The situation differs from that of FIGS. 1, 2 and 3 in that the wedge actuating means (27, 29) extends through the end of second leg 7'' away from plate 1 rather than through it as in FIGS. 1, 2 and 3. The means however is identical in that it consists of a stud 29 threadedly received into a bore 27 and pressed against wedge 11' by a hexagonal key 30.

Figures 14, 15:
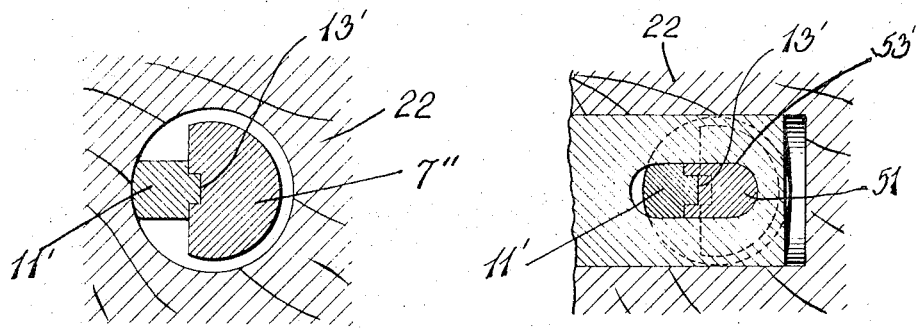
FIG. 14 is a cross-sectional view taken along lines 14—14 of FIG. 8.
FIG. 15 is a cross-sectional view taken along lines 15—15 of FIG. 13.

It will readily be understood by inspection of FIGS. 13, 14 and 15 that as stud 29 is rotated and pressed against wedge 11' the latter forces element 22 leftward against the other construction element 20; the wedging insert 11' riding on the stationary wedging surface 13'.

Several modifications may be made to the above described embodiments of the invention without departing from the spirit of the invention, the scope of which should only be construed from the appended claims.

I claim:
1. A coupling for joining together two construction elements, comprising:
 (a) a generally flat plate;
 (b) a pair of parallel legs projecting from one face of said plate and spaced from one another a fixed predetermined distance;
 (c) one of said legs formed with a wedge recess defining a sliding surface inclined towards said other leg;
 (d) a wedge in said recess having an inclined surface applied against said sliding surface of said recess and a frontal surface generally parallel to said other leg whereby displacement of said wedge along said sliding surface causes displacement of said frontal surface toward and away from said other leg to vary said predetermined distance, and
 (e) means extending through said plate to displace said wedge for sliding thereof along said sliding surface.
2. A coupling as claimed in claim 1, wherein said recess defines a further surface generally parallel to said plate and at the end of said sliding surface adjacent said plate, said means to displace said wedge extending through said further surface to be applied against said wedge.
3. A coupling as claimed in claim 1 wherein said means is a threaded stud threadedly movable in a hole through said plate to cause movement of the insert.
4. A coupling as claimed in claim 1 wherein the cooperating inclined surfaces of the recess and wedge are provided with interengaging groove-and-tongue guiding means extending in the general direction of movement of the insert.
5. A coupling as claimed in claim 1 wherein the cooperating inclined surfaces are provided with interengaging locking serrations.
6. In a construction joint, the combination comprising:
 (a) two construction panels disposed in edge facing relationship each with a generally planar surface normal to the edge thereof in alignment with a similar surface of the other panel; said panels formed with holes extending at least partially therethrough and through said aligned planar surfaces; the bores of said holes generally parallel to said facing edges;
 (b) a generally flat plate sitting on both said planar surfaces and bridging said facing edges;
 (c) a pair of spaced parallel legs projecting from one face of said plate; one leg snugly fitting in one of said holes and the other leg loosely fitting in the other hole;
 (d) said loosely fitting leg formed with a wedge recess defining a sliding surface inclined toward said other leg;
 (e) a wedge in said recess having an inclined surface applied against said sliding surface of said recess and a frontal surface abutting the bore of the corresponding hole whereby displacement of said wedge in one direction along said sliding surface causes displacement of said frontal surface toward said other leg and said panels toward edge abutting relationship, and (f) means extending through said plate to displace said wedge for sliding thereof along said sliding surface.

7. The combination as claimed in claim 6, wherein said recess defines a further surface generally parallel to said plate and at the end of said sliding surface adjacent said plate, said means to displace said wedge extending through said further surface to be applied against said wedge.

8. A coupling as claimed in claim 6, wherein said means is a threaded stud threadedly movable in a hole through said plate to cause movement of the insert.

References Cited by the Examiner
UNITED STATES PATENTS

| | | | |
|---|---|---|---|
| 2,140,772 | 12/1938 | Slayter et al. | 20—92 X |
| 2,340,864 | 2/1944 | Carpenter | 20—92 X |
| 2,417,654 | 3/1947 | LeVan | 287—54 |
| 2,632,536 | 3/1953 | Skeel | 189—36 X |

HARRISON R. MOSELEY, *Primary Examiner.*

P. M. CAUN, *Assistant Examiner.*